(12) United States Patent
Deshmukh et al.

(10) Patent No.: US 7,472,242 B1
(45) Date of Patent: Dec. 30, 2008

(54) ELIMINATING DUPLICATE BLOCKS DURING BACKUP WRITES

(75) Inventors: Vijay Deshmukh, Sunnyvale, CA (US); Stephen Manley, Livermore, CA (US); Collin Park, Redwood City, CA (US); Kiyoshi Komatsu, San Mateo, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 346 days.

(21) Appl. No.: 11/354,393

(22) Filed: Feb. 14, 2006

(51) Int. Cl.
*G06F 12/00* (2006.01)
(52) U.S. Cl. ..................................... 711/162
(58) Field of Classification Search ........................ None
See application file for complete search history.

(56) References Cited

U.S. PATENT DOCUMENTS

| | | | |
|---|---|---|---|
| 5,819,292 A | 10/1998 | Hitz et al. | |
| 6,085,298 A * | 7/2000 | Ohran | 711/162 |
| 6,928,526 B1 | 8/2005 | Zhu et al. | |
| 7,065,619 B1 | 6/2006 | Zhu et al. | |
| 7,072,910 B2 | 7/2006 | Kahn et al. | |
| 7,127,577 B2 | 10/2006 | Koning et al. | |
| 7,337,288 B2 * | 2/2008 | Kiselev et al. | 711/162 |
| 2007/0027937 A1 * | 2/2007 | McGrattan et al. | 707/204 |

* cited by examiner

*Primary Examiner*—Hiep T Nguyen
(74) *Attorney, Agent, or Firm*—Blakely, Sokoloff, Taylor & Zafman LLP

(57) ABSTRACT

Embodiments of the present invention include creating a subsequent backup copy of a data set by storing a full backup copy of the data set to reflect a state of a data set including blocks of data, at a first point in time. At a second point in time, after the first point in time, changes to the data set are identified. Next, as part of the subsequent backup copy, only each block of the data set which has been changed or added since the first point in time is stored.

19 Claims, 10 Drawing Sheets

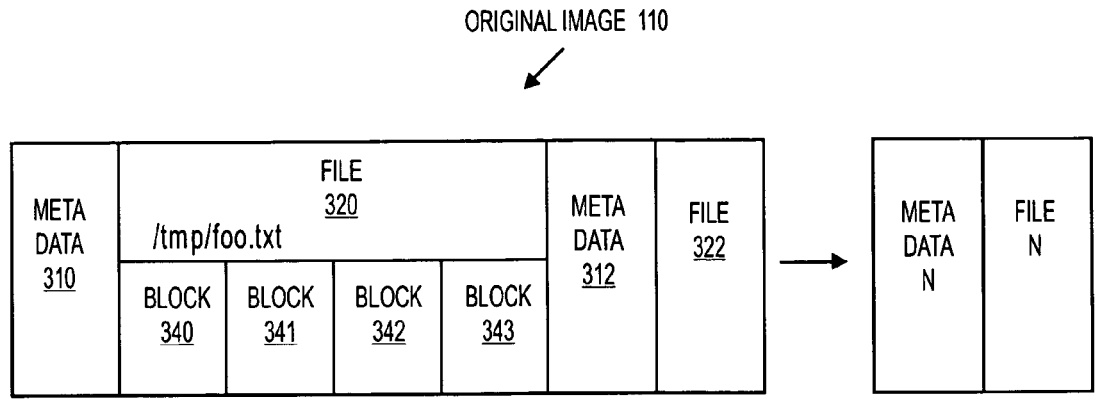
FIG. 3
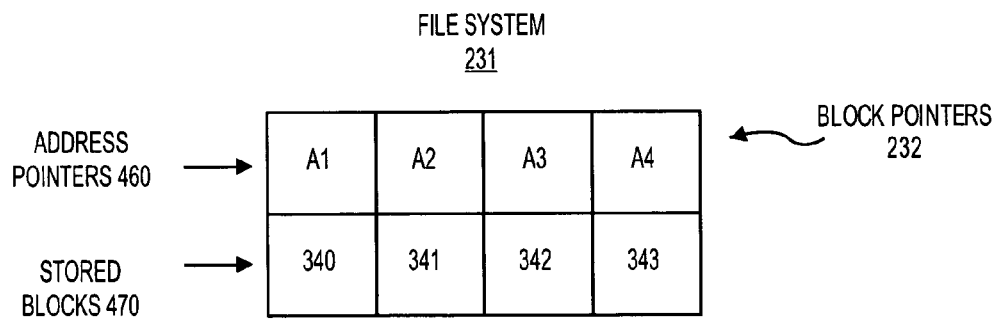
FIG. 4A
FIG. 4B

DATA RESTORE FOR FILE 320-910

| ADDRESS POINTED TO BY FILE SYSTEM 231-910 | | | | BLOCKS RESTORED 930 | | | |
|---|---|---|---|---|---|---|---|
| A1 | A2 | A3 | A4 | | 340 | 341 | 342 | 343 |
| A1 | A2 | A5 | A6 | A7 | 340 | 341 | 542 | 543 | 544 |
| A1 | A2 | A5 | A8 | A7 | 340 | 341 | 542 | 743 | 544 |

RESTORE OF ORIGINAL IMAGE 110

RESTORE OF 1ST INCREMENTAL IMAGE 112

RESTORE OF 2ND INCREMENTAL IMAGE 114

FIG. 9

ELIMINATING DUPLICATE BLOCKS DURING BACKUP WRITES

BACKGROUND

1. Field

At least one embodiment of the present invention pertains to saving storage space in a backup device by writing only blocks of data that have been updated or are new when backing up data from backup images.

2. Background

Electrically operated machines, such as general-purpose and special-purpose computing devices (e.g., "computers"), data storage devices or systems, network servers, file servers, and Internet servers typically include computer processors and other devices (often operating under the control of a processor) that frequently need to store information or data in, or retrieve information or data from a computer memory. For example, computing devices may include network servers, file servers, Internet servers, and/or client devices that store data in various types of memory (e.g., in mass storage devices, such as disk drives). These computing devices may include a data storage device having or providing access to a "storage subsystem" having a number of mass storage devices, such as disk drives, which may be in a disk array.

Data stored in computing devices may be harmed or become corrupt, such as, as a result of various factors or events including computer viruses, security breeches, user operator errors, hacker attacks, and the like. All of these can destroy data, and halt or "crash" the entire computing device. This may result in great loss of data, time, and/or money for the user.

In order to maximize protection and minimize such data harm and corruption, data backup and recovery technology for computing device storage and/or disk memories (e.g., for mass storage devices, physical memory, disk storage, and/or other data storage of computing devices) is often used. Using this technology, important data, some of the data, or all of the data stored in storage of a computing device (e.g., a "source device") can be copied to a protected area and "recovered" (e.g., recalled and/or restored to the storage memory), when necessary. For example, backup data can be copied from a source device to a "backup device" such as a data storage device, a network server, file server, or Internet server to "backup" data, so that the backed up data can later be recovered by the source device. Such backup and recovery may involve other entities, such as other computing devices which may manipulate, select, or otherwise process the data transmitted between the source and backup device.

Like the source device, the data storage device backing up the data may include or provide access to various types of storage space and/or disk space "memory" to which the backup data may be written to and recovered from. The data storage device may include or provide access to a "storage subsystem" having a number of mass storage devices, such as disk drives, which may be in a disk array. The storage subsystem may be located locally or remotely from the data storage device. Reading data from the drives and writing data to the drives can be controlled by an operating system and use a random access memory (RAM) type "main memory".

For example, a "full" backup may be performed by sending an original backup image from a source device, including all of the data stored (e.g., all of the directories and files) on the source device (e.g., a client, a server, or one or more other computing devices) that it is desired to backup at a point in time. Subsequently, an "incremental" backup may be performed by sending an incremental backup image from the source device, including all of the same data as the full backup, or a portion thereof, such as after a selected period of time, or at a second point in time after the first point in time. Although, according to some embodiments, an incremental backup image may include less than all or a portion of all of the data of the full backup image. In this case, a "full backup" and an "incremental backup" are two completely different types of backups. First, a full backup of all the data directories and files to be backed up for a source device is performed; then one or more incremental (or differential) backups are performed, based on the directories and files of the full backup, to update the backup data with updates to all or a portion of the directories and files of the full backup. However, this approach may not optimize disk space. For example, to store subsequent backup increments, backup writes to a backup device may require almost the same amount of additional disk space as the disk space used to save the original full backup of a set of data. In some cases such incremental backups may require an additional amount of disk space equal to more than 90% of the data disk space required for the original image. Similarly, a second full backup performed after the first full backup may require an additional amount of disk space equal to more than 90% of the data disk space required for the original full backup image. Thus, almost twice the disk space of the original backup may be required to save a full backup and an incremental backup from the source device (e.g., even in cases where the incremental backup stores only files updated or added since the first point in time).

It may be desirable to minimize or reduce the amount of disk space required to store backup data. It may also be desirable to minimize the amount of time, processing time, and computing resources required to store backup data.

SUMMARY OF THE INVENTION

Embodiments of the present invention include creating a subsequent backup copy of a data set by storing a full backup copy of a data set to reflect a state of the data set including blocks of data, at a first point in time. At a second point in time, after the first point in time, changes to the data set are identified. Next, as part of the subsequent backup copy, only each block of the data set which has been changed or added since the first point in time is stored.

BRIEF DESCRIPTION OF THE DRAWINGS

Various features, aspects and advantages will become more thoroughly apparent from the following detailed description, the set of claims, and accompanying drawings in which:

FIG. 3 shows an example of an original backup image structure.

FIG. 4A shows pointers to blocks of backup data for an original backup image.

FIG. 4B shows blocks of backup data stored in physical memory for an original backup image.

FIG. 9 shows blocks of backup data recalled for a recall of various backup images.

DETAILED DESCRIPTION

Figure 1:
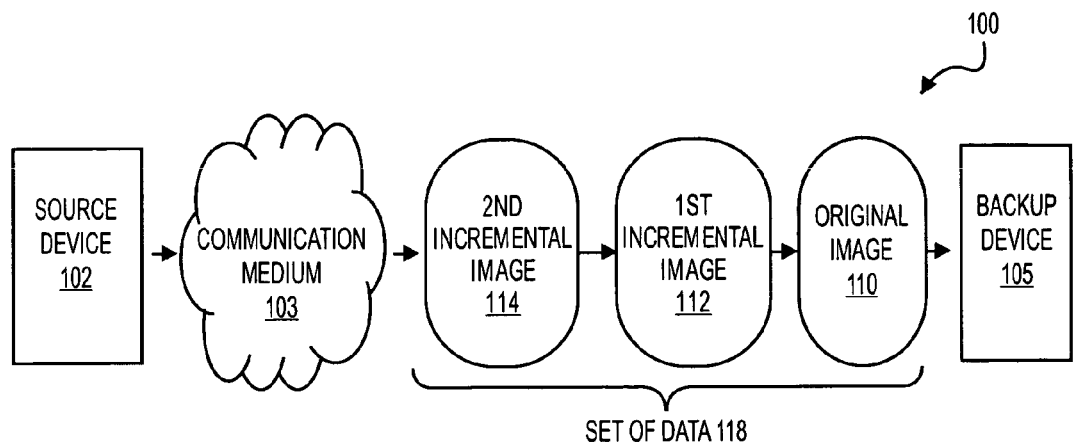
FIG. 1 shows an example of a network-based data backup environment.

According to embodiments of the invention, it is possible to use a backup device to store only changed or new data of all or selected portions of backup images received from a source device. For example, in some cases, a backup device may store only changed or new files (e.g., not the common or duplicate files) of all or selected portions of incremental backup images received from a source device after the original image. However, compared to a backup device that performs a file by file backup process (e.g., stores from a backup image, files that have data that has changes since a prior backup image without regard to how many block are changed in each file being backed up) it is possible to reduce the amount of storage memory space required to store backup data images by identifying and eliminating common or duplicate blocks of data when writing data from a backup image into the storage space. Such storage space may include or be disk space, physical memory, mass storage devices and/or secondary storage devices (e.g., other than main memory or random access memory (RAM)) as known in the art. For example, storage space (or storage memory) may refer to an amount of bits or bytes of disk memory, disk space, physical memory, mass storage or secondary storage (other than main memory or RAM) required to store the data described herein.

In other words, embodiments of the present invention include creating a subsequent full or incremental backup of a data set (e.g., a set of data) by storing a full backupt copy of the data set to reflect a state of a data set including blocks of data, at a first point in time. At a second point in time, after the first point in time, a subsequent full or incremental backup is performed. Next, as the subsequent backup is preserved in storage space (e.g., storage media), only each block of the data set which has been changed or added since the first point in time is stored.

In some cases, the common or duplicate files may be eliminated and then the common or duplicate blocks of data of the changed or new files may be eliminated when writing data from a backup image. As a result, only the changed or new blocks of the changed or new files will be saved. Put more simply, only the changed or new blocks of any image (e.g., they are all new for an original image) are stored, and/or all of the common or duplicate blocks of any image are discarded. The discarding of common blocks; and/or saving of only changed or new blocks may be described as "de-duplication." Also, de-duplication or "de-duped" may mean a duplicate block of same data (e.g., the same data as that of a block from a prior backup image) that was eliminated and linked to the already existing block (e.g., from the prior backup image). As compared to repeatedly storing full backup images, this concept drastically reduces or avoids storage space consumption. Similarly, this concept drastically reduces storage space consumption requirements as compared to repeatedly storing all of the files, or all of the changed and new files of incremental backup images. Specifically, a backup device that performs a file by file, file system process on conventional file data structures may not optimize disk space. For example, backup writes to a backup system of the backup device (e.g., such as to mass storage devices, a data storage device, or a storage server storing the backup data) using Veritas NetBackup® (VERITAS Global Software Corp., Mountain View, Calif.) require almost the same amount of storage space to store subsequent backup increments (e.g., incremental backup images) of only files that have changed data or new files, as the storage space used to save the original full backup of the set of data, or the original backup image (e.g., storing the original image and the incremental image provides a full backup of a set of data including those two images).

Herein, a backup image may be an entire source file or a "tar" image file (e.g., a UNIX compatible "tar" format, or a tar (tape archive) file format in common use in UNIX systems). For instance UNIX may refer to Unix System Laboratories® owned by The SCO Group, Inc. of Suite 100 355 South 520 West Lindon Utah 84042. Herein, a backup image may having a tar file header (512 bytes), followed by File Contents, followed by a tar end of file (EOF) (1024 bytes of zeroes). A backup image may be generated using a "tar" utility (See UNIX "man 5 tar" and "man tar"). In some cases, the backup image may be in a Veritas NetBackup® (VERITAS Global Software Corp., Mountain View, Calif.) "tar" format. Moreover, the concepts described herein maybe applied to image files in a "tar" format such as a standard UNIX tar format, a tar format derived from a standard UNIX tar format, a generic tar format, or any other backup image or backup source data including blocks of data to be backed up and information data (e.g., meta-data). The information data may include information to identify a file path (e.g., such as to identify a file path sufficiently for a file system), information providing an offset of where a file starts and where a file ends in the image, and identification of which blocks of the image belong to which file identified in the file path (e.g., in the meta data). Thus, the concepts described herein may be applied to back up a source file or an image file that includes blocks of data that are parts of files, identification of the file paths for the files, offsets of where each file starts and ends, and identification of which blocks are included in which files.

On the other hand, according to embodiments of the invention, when blocks of data of a subsequent backup image are being written to storage of a backup device (e.g., after a prior image), it is possible to compare the blocks of each file of the subsequent image with blocks already existing as stored backup data for that file from a prior image. If a block of the file is a duplicate in the subsequent and prior image, it can be eliminated from data of the subsequent image stored on the backup device, and pointers or recall access to the duplicate block can be directed to the already existing block. This concept can be applied as the blocks of data for the image are being written or stored into the storage space, rather than post-processing (e.g., rather than after the entire backup is written to the storage space). For example, as compared to an original or previous backup image, a subsequent incremental backup will require much less additional storage space than if this technique was not used, such as an additional amount of storage space equal to only approximately 10 percent of the data storage space (e.g., blocks of data) required for the original or previous image when 90 percent of the storage space (e.g., blocks of data) of the subsequent image is the same as the data of the original or previous image.

Moreover, storage space saving is achieved, since this process can be performed during writing of the blocks of data from the backup image, without additional "scratch" space, or without the need for additional data structures, such as maps and the like (e.g., additional storage space, additional data buffers, or additional storage memory for the data blocks is not required). This space saving may also be referred to as space compression. In addition, this process can be performed in "real" time or "on the fly" as the backup of the subsequent image is being performed. In some cases, "real time" may describe storing the necessary blocks to backup and image during a time period that is less than or equal to the period between receipt of the first data bits of a backup image and a time after receipt of the final bits of the backup image, that it would take to store the entire image in a storage memory (e.g., disk memory) of a backup device. Similarly, "real time" may describe storing the necessary blocks to backup and image without requiring no scratch space. Also, according to some embodiments, writing a subsequent backup image to storage of a backup device can be performed during post-processing (e.g., can begin writing the data after receipt of the final bits of the backup image). Thus, such concepts minimize or reduce the amount of storage space required to store backup data and/or minimize the amount of time, processing time, and computing resources required to store backup data.

It can be appreciated that there may be trade offs between doing block by block processes as compared to other processes used to backup data. For example, a block by block process may increase file system overhead but reduce storage space as compared to a file by file process (e.g., a process that stores from a backup image, files that have data that has changes since a prior backup image without regard to how many block are changed in each file being backed up).

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "file system" refers to a computer-related entity, either hardware, firmware, software, a combination thereof, or software in execution. For example, a file system can be, but is not limited to being, a process running on a processor, a processor, an object, an executable, a thread of execution, a program, and a computer. By way of illustration, both an application running on a server and the server can be part of a file system.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

An "operable connection", or a connection by which entities are "operably connected", is one in which signals, physical communication flow, and/or logical communication flow may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer machine executable or processor instructions that can be read, interpreted, compiled, and/or executed and that cause a computer, machine, or processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in storage and/or a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial parallel, massively parallel and other manners.

Suitable software for implementing the various components of the example systems and methods described herein include programming languages and tools such as Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

FIG. 1 shows an example of a network-based data backup environment. FIG. 1 shows backup environment 100 including source device 102 communicating multiple backup images through communication medium 103 to backup device 105. Specifically, FIG. 1 shows original image 110 sent by device 102 to device 105, followed by subsequent backup image, first incremental image 112. Image 112 is followed by subsequent backup image, second incremental image 114. It can be appreciated that each image may correspond to a "backup" of data from source device 102 that may include all, or a portion of the data stored in a memory, storage, and/or disk space of source device 102. Moreover, backups may be performed before image 110 or after image 114. Set of data 118 of FIG. 1 is described as the data to be backed up in images 110, 112, and/or 114. For instance, set of data 118 may be the data of all of the images currently received by device 105. Thus, if only image 110 has been received, set of data 118 will only contain data of image 110. Alternatively, if only images 110 and 112 have been received, set of data 118 will only contain data of images 110 and 112. Set of data 118 may be expanded to include additional subsequent images (e.g., image 114 and images in addition to image 114). Each of images 110, 112, and 114 may be described as a "copy of a data set" of device 102 to be backed up, such as where each of images 110, 112, and 114 includes at least one similar file of data to be backed up.

The data of images 110 through 114 may be backed up or stored at device 105 by performing a file by file system process on file data structures. In addition, device 105 may use a file system to track which blocks of each file are new or have been updated since a previous image. Thus, according to embodiments of the invention, systems and methods, such as those described herein with respect to device 105, may perform block by block, file system processes on block data structures.

FIG. 1 shows source device 102. Source device 102 may be an electrically operated machine or computing system, such as a client device, a data storage device, a network server, a file server, a storage server, a Veritas Server (such as a server using Veritas NetBackup® of VERITAS Global Software Corp., Mountain View, Calif.), including or not including a data storage device and/or one or more mass storage devices. Device 102 may be, for example, a personal computer (PC), workstation, electronic device, computational device, or the like as known in the art.

Communication medium 103 may be a wired or wireless communication medium. For example, medium 103 may include a local area network (LAN), intranet, wide area network (WAN), global area network (GAN), such as the Internet, and/or various other networks over which data is communicated using wired, optical, wireless, acoustical, electromagnetic radiation, and/or other medium as known in the art. According to some embodiments, medium 103 may not exist between source device 102 and backup device 105, such as where there is no network between those devices, or where those devices are the same device.

Backup device 105 may represent a data storage device, storage, server, network server, file server, where reading data from mass storage devices (e.g., disks 250 of FIG. 2) and writing data to mass storage devices of the server is controlled by an operating system (OS). Backup device 105 may be a file server, or it could be a server that provides clients with block-level access to stored data (such as used in a storage area network (SAN)), or a server than can provide both file-level or block-level access to the stored data. For example, backup device 105 may have extensive storage resources and services, protected by a data redundancy scheme such as a redundant array of inexpensive or independent disks (RAID), backup, and power reliability measures. Data storage services may be provided on a per-file basis, where backup device 105 appears as to its clients as a network file server, or on a per-block basis, where backup device 105 appears to the clients as a directly-attached disk drive. "Blocks of data" or "data blocks" may include or consist of, for example, 1,024 (1K) bytes, 4,096 (4K) bytes, or other numbers of bytes of user data. In either situation, backup device 105 may need to move large quantities of data about, both internally and between its clients and its mass storage devices. In some cases, each block of data (e.g., on the source system) may be uniquely identified by its fully qualified path and offset (block number). For instance, if two files in two backups have the same full path (e.g. its fully qualified path and offset), they may be treated as potential targets for elimination from storage on the backup device (e.g., potential targets for de-duplication). Also, each block of data may be uniquely identified by file system identification (FSID) number and a block number; and/or by inode (see FIGS. 11-12).

According to some embodiments of the invention, backup device 105 may be an apparatus or a computing device, such as a general purpose computing device and/or special purpose computing device, a data storage device and/or system, a network server, a network-based storage environment and/or device, a file server, an Internet server, a desktop computer, a laptop computer, a portable computing device, a handheld computing device, a telephone, a cellular telephone, a gaming device, an Internet related computing device, a digital video disk (DVD) player, a set top box, etc., and/or another device or system that may access or include a memory, storage, and/or disk space to provide read and write access to data.

Figure 2:
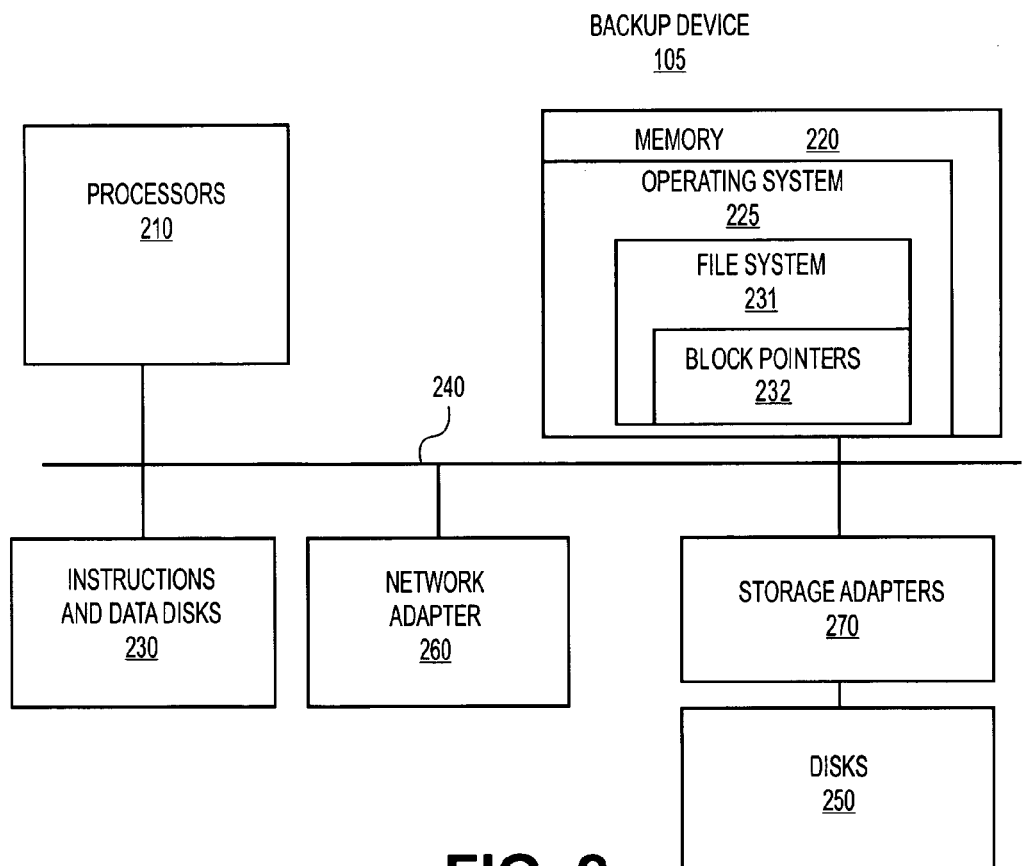
FIG. 2 is a block diagram showing an architecture of a backup device.

Backup device 105 may control a number of the storage subsystems such as data storage devices that may each include one or more mass storage devices, such as data storage disks. For example, backup device 105 may be a storage server having a storage subsystem (e.g., a data storage device), a main memory and a cache memory. The storage subsystem may be used to store backup data on behalf of one or more source devices (e.g., such as device 102). For instance, FIG. 2 is a block diagram showing an architecture of a backup device. FIG. 2 shows backup device 105 including system bus 240 operably connecting processors 210, memory 220, network adaptor 260, and storage adaptors 270. Adaptors 270 are operably connected to disks 250. Certain standard well-known components, which are not germane to embodiments of the present invention, may not be shown.

Bus 240, shown in FIG. 2, is an abstraction that represents any one or more separated physical buses and/or point-to-point connections, connected by appropriate bridges, adapters and/or controllers. Bus 240, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). In some cases, bus 240 is a host bus, such as a bus to interface a host (e.g., processors 210) to peripheral devices (e.g., disks 250).

Processors 210 may be the central processing units (CPUs) of server 140 and, thus, control and coordinate the overall operation of the server. In certain embodiments, the processors 210 accomplish this by executing software, such as operating system 225 stored in memory 220. A processor of processors 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 may be or include the "main memory" of device 105. Memory 220 represents any form of random access memory (RAM), read-only memory (ROM), flash memory, or the like, or a combination of such devices. Memory 220 may include various types of memory, such as RAM, dynamic RAM ("DRAM"), standard dynamic RAM ("SDRAM"), double data rate RAM "DDRRAM", and double data rate version 2 RAM, "DDR2RAM". For instance, memory 220 may be one or more banks of memory chips, integrated circuits, types of RAM, etc. as known in the art.

Also connected to processors 210 through bus 240 are disks 230. Disks 230 may be one or more internal mass storage devices including any conventional medium for storing large volumes of data in a non-volatile manner, such as described for disks 250 (e.g., one or more magnetic or optical based disks). Disk 230 may contain other instructions and data that are not immediately required by the system in its operations. According to some embodiments, disks 230 may be considered a "storage system" for server 140. As described herein, a "storage system" may include one or more mass storage devices, storage facilities, non-volatile storage facilities, and/or other non-cache memories.

Network adapters 260 provide the server with the ability to communicate with remote devices, such as device 102, over a network (e.g., medium 103) and may be, for example, an Ethernet adapter or Fibre Channel adapter (e.g., in a SAN implementation). Storage adapters 270 allow the server to access storage subsystems, such as disks 250, and may be, for example, a Fibre Channel adapter or a SCSI adapter. Thus, device 105 can communicate with its clients through network adapters 260, and with its mass storage devices (such as disks 250) through storage adapters 270.

For instance, storage adapters 270 and network adapters 260 may have input/output hardware, adapters, or connectors (e.g., described herein as an I/O) for communicating data between disks 230 and/or disks 250, and remote devices.

Disks 250 and/or 230 may include a data storage subsystem or a data storage device including one or more mass storage devices, disk arrays, mass storage devices organized into one or more volumes of a RAID, storage facilities, non-fallible storage facilities, and/or other memories. Each mass storage device may be, for example, a conventional magnetic disk, an optical disk such as a compact disk-read only memory (CD-ROM), or digital video disk (DVD) based storage, magneto-optical (MO) storage, organic, biological, or any other type of non-volatile storage devices suitable for storing large quantities of data as known in the art. Disks 250 and/or 230 may be disk space or storage space other than main memory or cache memory of a computing device (e.g., device 105). Specifically, disks 250 and/or 230 may include one or more mass storage devices (e.g., may be a disk array) and may be considered "a storage subsystem" for device 105.

Operating system 225 may include or be built "on top of" a conventional OS, such as disk operating system (DOS), Windows® (by Microsoft Corporation of Redmond, Wash.), UNIX (of Unix System Laboratories®), LINUX (of Linux Networx Corporation of 14944 Pony Express Raod Bluffdale, Utah 84065), OS/2® (by Microsoft Corporation of Redmond, Wash.), OS/9® (by Apple Computer of Cupertino, Calif.), XENIX® (by Microsoft Corporation of Redmond, Wash.), etc. as known in the art. For instance, operating system 225 may include an operating system such as WINDOWS XP®, or another WINDOWS® operating system by Microsoft Corporation of Redmond, Wash. Operating system 225 may also include a MACINTOSH® operating system by Apple Computer of Cupertino, Calif. Also, an example of operating system 225 may be or include, without limitation thereto, Data ONTAP® by Network Appliance, Inc. of Sunnyvale, Calif. Data ONTAP® is commercially available from or sold by Network Appliance, Inc. of Sunnyvale, Calif. Moreover, device 105 may include, store, load, and execute or run a computer program, operating system 225, a file system, a filer software application or other software application, or a sequence of instructions to write only blocks of data that have been updated or are new when backing up data from backup images from source device 102 (e.g. see FIGS. 3-10).

Device 105 may also include, as part of the operating system 225, backup software or a backup application to provide for (e.g., perform processes of) backing up data, copies of data sets and/or backup images of source 102 and for recovering that data. As such, device 105 may also include, as part of the Data ONTAP® operating system, the NearStore® backup software by Network Appliance, Inc. of Sunnyvale, Calif. NearStore® is commercially available from or sold by Network Appliance, Inc. of Sunnyvale, Calif.

Furthermore, as part of operating system 225 and/or backup software of system 225, device 105 may include file system 231 or a filer software application. Operating system 225, file system 231, and/or another software application to perform the functions described herein may be loaded into memory 220, such as from a storage system like disks 230 (or in some embodiments from a storage subsystem such as disks 250), and launched after power on self test (POST), boot-up, or initialization of device 105. Operating system 225, file system 231, and/or another software application to perform the functions described herein may each be a set of one or more programs which control device 105's operation, the allocation of resources, and the reading and writing of backup data. For instance, such functions include those performed by operating system 225 to create and update filed system 231, such as to including those to create and update pointers 232 to point to blocks of data written to disks and/or disks 250 in order to backup data received from device 102 (e.g., such as in order to backup images 110 through 114). Pointers 232 may point to addresses or locations in storage space, such as addresses or locations in physical memory, disks 250 and/or disks 230, at which are located blocks of data (e.g., blocks of backup data written to storage space from backup images). An example of filed system 231 and/or update pointers 232 may include read-only, persistent point-in-time images ("RPPI") as described further below with respect to FIGS. 11 and 12.

According to some embodiments of the invention, operating system 225 may include or access a machine accessible medium (e.g., disks 250 and/or 230) containing a sequence of instructions (such as including a filer or other application) that when executed by a processor (such a processors 210) cause device 105 to quickly identify and eliminate common or duplicate blocks of data when writing data from a backup image to disks 250 and/or 230.

Furthermore, file system 231 or a filer software application of operating system 225 may include block pointers 232. Pointers 232 may point to blocks in a file system of the most recent (e.g., the one received just before the one currently being received) or previous backup image. For instance, pointers 232 may point to addresses in storage space of device 105 where files and blocks of data of a most recent image received from source 102 are stores. Pointing to or otherwise identifying blocks of data, files, file systems, and/or images of data by file system 231 and/or pointer files 232 may also be described as "referring to" or "referencing" those blocks of data, files, file systems, and/or images of data.

Moreover, according to embodiments, file system 231 may be a mirror of the file system of the data included in a backup image received from device 102. Thus, file system 231 may mirror the structure of the file system of source device 102, such as the file system including files and blocks of image 110. For instance system 225 and/or 231 may create and update (e.g., maintain) a file system to track or maintain a record of the file system of each image of backup data received from device 102. This file system may include pointers 232 to point to the most recent or previous (e.g., the one received just before the one currently being received) backup image. In some cases, as device 105 receives a backup image, system 225 scans the image. As system 225 identifies directories in the image, system 225 and/or system 231 creates a corresponding directory in the active file system (e.g., pointers 232). Thus, file system 231 may mirror the structure of the file system of source 2, such as the file system including files and blocks of image 110. When subsequent images (e.g., incremental images after image 110) are received, system 231 may keep a record of image 110, while pointers 232 (which are also part of system 231) track or are updated to mirror the file system of blocks stored for the subsequent image.

A file system is a data structure (or set of data structures) and associated logic that facilitate tasks related to storing data in a computer system: allocating and freeing storage space on mass storage devices; reading and writing data; creating, modifying and deleting files; maintaining hierarchical directory structures; and so forth. File system data structures are typically fairly complex, with interdependent fields that must be maintained consistently to avoid data corruption or loss. Various techniques and protocols to maintain file system consistency despite hardware errors and failures, power loss, and similar exigencies are known in the art. For example, several mass storage devices such as hard disk drives can be combined into a Redundant Array of Independent Disks ("RAID") and operated so that the failure of any single device will not affect the availability of data stored on the RAID.

In some cases, file system 231 may include or be a system similar to WAFL® by Network Appliance, Inc. of Sunnyvale, Calif. WAFL® is commercially available from or sold by Network Appliance, Inc. of Sunnyvale, Calif. A further description of a file system and/or pointers that may be used with embodiments of the invention are described further below with respect to FIGS. 11 and 12.

FIG. 3 shows an example of an original backup image structure. FIG. 3 shows original backup image 110 including meta-data 310 (e.g., a meta-data field), file 320 (e.g., with filename /tmp/foo.txt), meta-data 312, file 322, and continuing to meta-data N and file N. Image 110 may include additional meta-data fields and data field (e.g., such as file fields like file 320) between file 322 and meta-data N. Likewise, image 110 may include only one meta-data field (e.g., meta-data 310) and only one data field (e.g., file 320). File 320 may represent a file having the same file name (e.g., /tmp/foo.txt) or being locatable by a file system even after blocks included in file 320 have been updated, deleted or added. Thus, a subsequent or incremental backup image from device 102 may include the file 320 of FIG. 3, but where the version of file 320 in the subsequent or incremental backup image includes updated blocks of data and/or additional blocks of data.

File 320 of image 110 is shown including block 340, block 341, block 342, and block 343. Meta-data 310 may identify that blocks 340-343 are the blocks of data for file 320, such as by indicating that blocks 340-343 are the only blocks of data in image 110 for file 320 of image 110. Meta-data 310 or other meta-data described herein may include other information typically included in meta-data fields as known in the industry. Similarly, file 320 and blocks 340-343 or other blocks described below for file 320 may include data, blocks, or files, as known in the industry. Likewise, image 110 and other backup images described herein may be backup images from a source, such as source 2, as known in the industry.

According to embodiments of the invention, blocks as described herein may be blocks of data consisting of, for example, 512 bytes, 1,024 (1K) bytes, 4,096 (4K) bytes, or other numbers of bytes of user data. In some cases, blocks described herein may represent blocks of dated, consolidated, aligned, or otherwise resized from other larger or smaller blocks of data. For example, blocks as described herein may represent 4,096 (4K) byte blocks aligned, or converted from a larger number of smaller, 512 byte blocks.

As noted above, file system 231 may be a mirror of the file system of the data included in a backup image received from device 102. Thus, file system 231 may mirror the structure of the file system of source 2, such as the file system including files and blocks of image 110.

For example, FIG. 4A shows pointers to blocks of backup data for an original backup image. FIG. 4A shows files system 231 including pointers 232 having address pointers 460 pointing to stored blocks 470. In FIG. 4A files system 231 corresponds to a file system or pointer files created by device 105 upon receiving image 110. Specifically, pointers 460 include pointer A1 pointing to block 340, A2 pointing to block 341, A3 pointing to block 342, and A4 pointing to block 343. Thus, in FIG. 4A system 231 and pointers 232 may represent pointers to blocks of data stored in a physical memory or storage space to back up file 320 of an image received from source device 102. Specifically, file system 231 may include file /tmp/foo.txt (e.g., where that file was created in the active file system, such as file system WAFL® by Network Appliance, Inc. of Sunnyvale, Calif. A similar concept applies for the other files of image 110, such that an expansion of system 231 and pointers 232 for the other files of image 110 may represent a full backup of image 110 for the data set of image 110 showing the state of that data set at a point in time.

Thus, system 231 and pointers 232 may reflect a "state" (e.g., file system and data of image 110) of a "copy of a data set" (e.g., image 110) from device 102 at a first point in time (e.g., when image 110 is taken by device 102). Moreover, for file 320, system 231 and pointers 232 of FIG. 4A may be a "full backup" of the copy of the data set showing the state of file 320 (e.g., reflecting the latest data received in backup images for the data set, or files included in image 110).

FIG. 4B shows blocks of backup data stored in physical memory for an original backup image. FIG. 4B shows physical memory 390 having blocks of data stored at addresses. Specifically, memory 390 includes blocks 340, 341, 342, and 343 stored at addresses A1, A2, A3, and A4 respectively. As shown by the arrows after address A4 and block 343, memory 390 may include additional addresses and blocks. Physical memory 390 may be storage space, storage memory, disk space, and/or a disk memory as known in the art, such as by including disks 230 and/or disks 250. Likewise, and pointers 232 of FIG. 4A may be stored in or included as part of a storage space as known in the art, such as disks 230 or disks 250.

As shown in FIGS. 3, 4A and 4B, blocks 340-343 may be stored in physical memory 390 as backup data for image 110 at a first point in time corresponding to a "Snapshot™" (Snapshot™ by Network Appliance, Inc. of Sunnyvale, Calif.

Snapshot™ is commercially available from or sold by Network Appliance, Inc. of Sunnyvale, Calif.) taken of a desired set of data of source device 102 at the first point in time.

In some cases, the processes described above with respect to FIGS. 3, 4A and 4B, may be described as occurring in "real time." Such processes (e.g., comparison) may be performed by system 225, 231 and/or software therein.

Figure 5A:
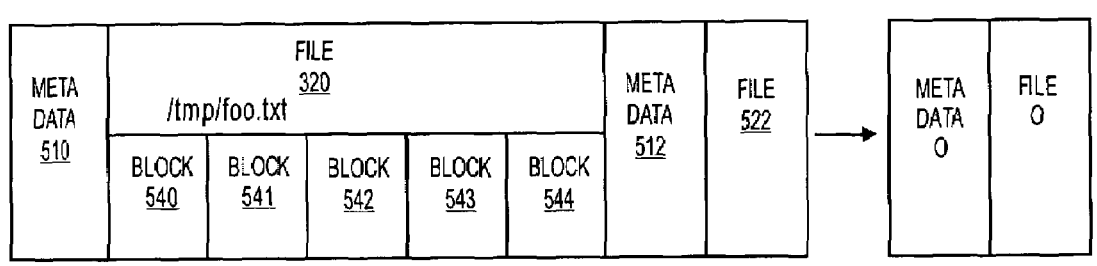
FIG. 5A shows a first incremental backup image structure.

FIG. 5A shows a first incremental backup image structure. FIG. 5A shows first incremental backup image 112 including meta-data 510, file 320 (e.g., with filename /tmp/foo.txt), meta-data 512, file 522 (e.g., with filename /tmp/fo1.txt not shown), meta-data 0 and file 0 (e.g., with filename/tmp/fo2.txt not shown). Meta-data 510 may be related to file 320, such as by identifying the blocks included in file 320, similar to the description above with respect to meta-data 310 and file 320 at FIG. 3. Also, image 112 may have more or less meta-data fields and file fields similar to the description above with respect to FIG. 3. File 320 of image 112 (e.g., /tmp/foo.txt) includes blocks 540, 541, 542, 543, and 544. Thus, in FIG. 5A, file 320 represents a file having the same file name (e.g., /tmp/foo.txt) or being the same file as 320 of FIG. 3, but including more blocks of data than file 320 did in image 110.

It is contemplated that meta-data 512 and file 522 (e.g., /tmp/fo1.txt) may or may not correspond to meta-data 312 and/or file 322 of FIG. 3. Likewise, meta-data O and/or file O may or may not correspond to meta-data N or file N of FIG. 3.

Similar to the description above with respect to FIGS. 3, 4A and 4B, device 105, system 225, system 231 and/or pointers 232 may be used to create and/or update a file system for image 112. Specifically, such creation and/or updating may occur prior to writing blocks of image 112 into physical memory. For example, device 105, system 225, or software or subsystems thereof may identify changes in the data set (e.g., image 110, 112, and 114) from the first point in time of image 110 to a second point in time of image 112. Such identification may include comparing files and blocks of files of image 112 versus those of image 110. First, the files may be compared to identify similar or matching files (e.g., such as files having the same filename and/or in a same inode of a file structure in image 112 as in image 110). Then, blocks of the similar or matching files may be compared to identify similar or matching blocks (e.g., blocks having the same or unchanged data as compared to each other in image 112 as in image 110).

For example, files 320 of images 112 and 110 may be identified as a match (e.g., these files may be described as "corresponding" files). Then, blocks 540-544 of image 112 may be compared to blocks 340-343 of image 110. Specifically, before de-duplication, the blocks for FILE 320, 540, 541, 542, 543, and 544 are compared "pairwise" with the blocks in the file present in the active file system (i.e., FILE SYSTEM 231 of FIG. 4A). For instance "pairwise" comparison of corresponding or matched files may be comparing "corresponding" blocks such as by comparing the first block (e.g., block 1) of the matched file of new image with the first block (e.g., block 1) of the matched file of the prior image; then comparing block 2 with block 2, block 3 with block 3, etc. of the matched file of the images. Thus, the blocks may be compared as follows: 540⇔340, 541⇔341, 542⇔342, 543⇔343, 544⇔0. Note since the last block 544 is new it is compared against block 0 which is assumed to be a hole. After de-duplication we get the picture shown in FIG. 5B.

Figure 5B:
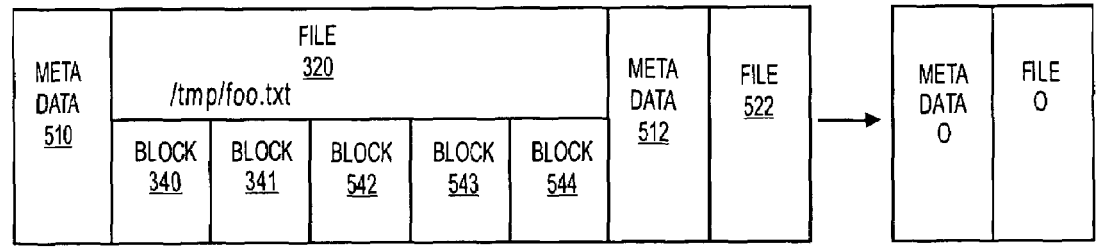
FIG. 5B shows a de-duped first incremental backup image structure.

FIG. 5B shows a de-duped first incremental backup image structure. FIG. 5B shows de-duped first incremental backup image 113 including meta-data 510, file 320, meta-data 512, file 522, meta-data O and file O. File 320 of image 113 (e.g., /tmp/foo.txt) includes de-duped blocks 340, 341 (e.g., block 541 is a corresponding block to block 341 and has the same data as block 341), and blocks 542, 543, and 544 (but does not include blocks 342 or 343). Thus, in FIG. 5B, file 320 represents a file having the same file name (e.g., /tmp/foo.txt) or being the same file as 320 of FIG. 3, but including updated blocks of data and/or additional blocks of data. Specifically, block 342 has been updated, such as to include more, less, or different data to become block 542 (e.g., block 542 is a corresponding block to block 342 but has different or updated data as compared to block 342). Likewise, block 343 has been updated to become block 543. On the other hand, block 544 is a new or additional block that was not included in file 320 of image 110 (e.g., block 544 does not correspond with any block blocks 340-343).

Thus, FIG. 5A shows the "before picture" of incoming blocks as being distinct, prior to being "de-duped". Alternatively, FIG. 5B shows the "after picture" identifying which incoming blocks are similar/unchanged (e.g., de-duped), which blocks are changed, and which blocks are new.

Such identifying may include determining blocks of data having data different (e.g., blocks 542, 543, and 544 for file 320 of image 112 are different than the blocks of file 320 for image 110) from blocks of data for the same file in a previous image. Moreover, such identifying may include identifying changed blocks (e.g., blocks 542 and 543) and/or new blocks (e.g., block 544).

According to some embodiments, identifying and or determining may include or be described as comparing file system identification (FSID) numbers, file names, inodes, file paths, file systems, file block numbers (FBN), block numbers, volume block numbers (VBN), a time stamp, a time of storage, a checksum, a parity, cyclic redundancy check (CRC), inode (see FIGS. 11-12), and/or other information, of blocks of data to determine if a block of data is the same as, is not changed, has the same data as, is an update of a block of a previous image, or is a new block. In some cases, comparing may include comparing each file and/or blocks fully qualified path and offset (block number) to identify duplicate blocks of corresponding blocks of the same filed received in two backup images. For instance, each block may be uniquely identified by its fully qualified path and offset. Thus, if any two files in two backup images have the same full path (e.g. its fully qualified path and offset), they may be treated as potential targets for elimination from storage on the backup device (e.g., potential targets for de-duplication).

For instance, a byte by byte comparison may be done between a block of a currently received image and a "corresponding" block of prior image. A "corresponding" block may be described as a block of the same file (e.g., file 320) having the same block number or block identification. For instance blocks 540, 541, 542 and 543 of file 320 of image 112 correspond to blocks 340, 341, 342 and 343 of file 320 of image 110, respectively.

Moreover, such a comparison may include comparing meta-data information of a file including blocks of a received image (e.g., such as meta-data 510) with file system information of a file including blocks of a prior image, where the file system information is derived from the prior image (e.g., such as derived from blocks 340-343 and/or from meta-data 310). More particularly, in some embodiments, file 320 of image 112 may match file 320 of image 110, such as where the filenames (e.g., /tmp/foo.txt) or other related meta-data of the files match. According to some embodiments, matching or similar files may be identified by their file path in an image as compared to the file path (e.g., which may be stored in a file system, like system 231) of a previous backup.

Once the files of the images are matched, the blocks may be compared. For instance, system 225 and or 231 may compare meta-data 510 identifying blocks 540, 541, 542, 543, and 544 as blocks of file 320 in image 112, with file system information is derived from blocks 340-343 and/or from meta-data 310 that identifies blocks 340, 341, 342, and 343 as blocks of file 320 in image 110. Such a comparison may identify that blocks 540, 541, 542, and 543 of file 320 in image 112, correspond to blocks 340, 341, 342, and 343 of file 320 in image 110, respectively. Also, such a comparison may identify that block 544 of image 112 does not correspond to any of blocks 340, 341, 342, and 343 of file 320 in image 110. In other words, the blocks of matched files may be compared "pairwise" to determine which blocks are corresponding. According to some embodiments, corresponding blocks may be identified by a match (e.g., an equality) between their specific file block number (FBN) in the file path in an image as compared to the FBN in the file path (e.g., which may be stored in a file system, like system 231) of a previous backup. A comparison can then be performed for corresponding blocks of each matched file in the images. The data of the corresponding blocks can be compared to determine which of those blocks are equal, similar, duplicates, or unchanged.

In some embodiments, some of the file block numbers (FBNs) of blocks of file 320 of image 112 may match the FBNs of blocks of file 320 of image 110. The FBNs may be transmitted in the images (e.g., as part of the meta-data and/or blocks). In other words, the FBNs of blocks 540, 541, 542, 543 and 544 of file 320 in image 112, may be compared with the FBNs of blocks 340, 341, 342, and 343 of file 320 in image 110. This comparison may identify blocks that have correspond, are deleted, and/or new blocks of data. For example, the FBNs of blocks 540, 541, 542, and 543 of file 320 in image 112, may match the FBNs of blocks 340, 341, 342, and 343 respectively, of file 320 in image 110, identifying that those blocks correspond to each other respectively. Also, the FBN of block 544 of file 320 in image 112, may not match the FBNs of any of the blocks of file 320 in image 110, thus, block 544 may be identified as a new block. The corresponding blocks of matched files can then be compared, byte by byte to determine if they are common blocks, duplicate blocks, or alternatively are updated or changed blocks (e.g., non-duplicate blocks).

Specifically, system 225 may perform a byte by byte comparison between block 542 of received image 112 and corresponding block 342 of image 110 stored in memory 390. Since block 542 is an update and had more, less, or different data than block 342, the byte by byte comparison will reveal that these blocks do not have the same data, have different data, that block 542 is a changed block, or that block 542 is an update of block 342. Alternatively, such a comparison will reveal that each of blocks 540 and 541 of image 112 has the same data, is a common block, or is a duplicate block with blocks 340 and 341 respectively, of image 110. Such a comparison may include a "bcmp" or "memcmp" comparison (e.g., a byte-by-byte comparison) as known in the art. It is also considered that such a comparison may include a bit by bit comparison, or other data comparison between data of a block of a currently received image and data of a corresponding block of prior image. This comparison may identify blocks that have the same data (e.g., match), duplicate blocks, blocks that have different data, and/or changed blocks of data.

Figures 6A, 6B:
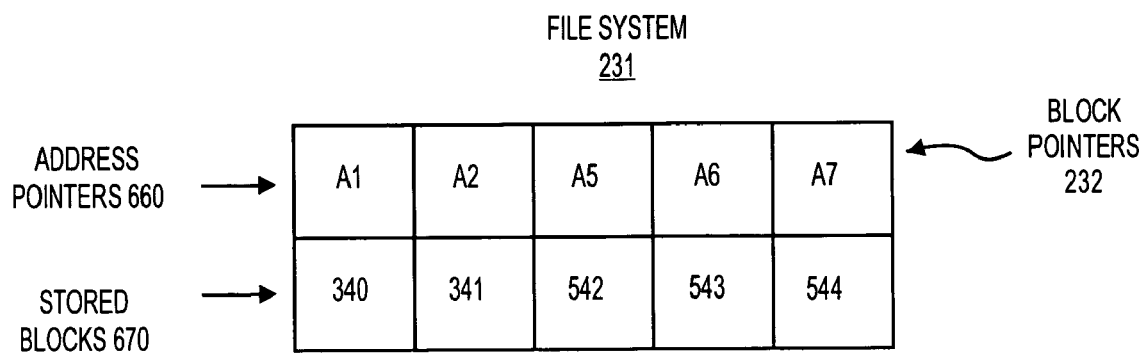
FIG. 6A shows pointers to blocks of backup data for a first incremental backup image.
FIG. 6B shows blocks of backup data stored in physical memory for a first incremental backup image.

Once the duplicate blocks are identified, instead of pointing to blocks 540 and 541 of file 320 in image 112, the file system may point to blocks 340 and 341 of file 320 in image 110 (see FIGS. 5B and 6A). Thus, the volume block numbers (VBNs) of the stored blocks 340 and 341 for file 320 of de-duped backup image 113 are the same as the VBNs for blocks 340 and 341 of file 320 of backup image 110 (see FIG. 5B).

According to embodiments of the invention, upon receiving image 112, device 105 and/or system 225 stores only blocks of data from file 320 of image 112 which have data different than blocks of file 320 for image 110. For example, blocks 340 and 341 are the same in image 110 as blocks 540 and 541 in image 112. However, block 542 and 543 are updates of blocks 342 and 343. Likewise, block 544 is an additional block. Therefore, blocks 542, 543, and 544 have data different from any "corresponding" blocks of file 320 in image 110. Specifically, block 542 corresponds to 342 and block 543 corresponds to block 343. However, block 544 does not correspond to any blocks of 320 of image 110. In other words, blocks 542, 543, and 544 are the only blocks from file 320 of image 112 stored upon receiving image 112 at device 105, because those blocks are the only blocks not included in image 110. Likewise, blocks 540, and 541 are duplicates between file 320 of image 112 amd image 110. Thus, blocks 540, and 541 are de-duplicated during the backup of image 112, by not being stored upon receiving image 112 at device 105, because those blocks are already stored at device 105 as blocks included in image 110.

Moreover, device 105 and/or system 225 updates file system 231 and/or pointers 232 upon receiving image 112 to point to the appropriate blocks so that the data of image 112 can be recalled. For example, FIG. 6A shows pointers to blocks of backup data for a first incremental backup image. FIG. 6A shows file system 231 and pointers 232 pointing to blocks of data stored in storage space in order to backup image 112 (e.g., by storing and pointing to blocks of image 113), which includes backup data from device 102 at a second point in time. Specifically, FIG. 6A shows address pointer 660 and stored blocks 670 including pointer A1 pointing to block 340, pointer A2 pointing to block 342, pointer A5 pointing to block 542, pointer A6 pointing to block 543, and pointer A7 pointing to block 544. Here, blocks 540 and 541 of image 112 have not been saved in storage space and file system 231 does not include pointers pointing to those blocks. Instead, in FIG. 6A, system 231 includes pointer 660 having pointer A1 and A2 still pointing to previously saved blocks 340 and 341 from image 110. In addition, pointers 660 include pointer A5 pointing to block 542, which is an update of block 342, pointer A6 pointing to block 543, which is an update of block 343, and pointer A7 pointing to block 544 which is a new or additional block. However, it can be noted, that pointer A3 pointing to block 342 and pointer A4 pointing to block 343 have not been replaced.

Specifically, FIG. 6B shows blocks of backup data stored in physical memory for a first incremental backup image. FIG. 6B shows physical memory 390 including addresses A1, A2, A3, A4, A5, A6, and A7 at which are stored blocks 340, 341, 342, 343, 542, 543, and 544 respectively. Thus, pointers 660 preserve and point to blocks of data for image 112 (e.g., image 113), and make it possible to restore the data of image 112, memory 390 also includes pointers A3 and A4 pointing to blocks 342 and 343 which are still stored in storage space. Thus, it is also possible to restore the data of image 110, by looking at the history of file system 231 to find pointers 460, which would provide for restoring blocks 340-343 of image 110 (restoring previous images is described further below with respect to FIG. 9).

As shown in FIGS. 5A, 5B, 6A and 6B, blocks 342, 343, 542, 543, and 544 may be stored in physical memory 390 as backup data for image 112 (e.g., when added with blocks 340, 341) at a second point in time corresponding to a "snapshot"

taken of a desired set of data of source device 102 at the second point in time, after the first point in time of described for FIGS. 3, 4A and 4B. Moreover, as described above for FIGS. 3, 4A and 4B, system 231 and pointers 232 may reflect a "state" (e.g., file system and data of image 112 or 113) of a "copy of a data set" (e.g., image 112) from device 102 at a second point in time (e.g., when image 112 is taken by device 102). Moreover, for file 320 of image 112, system 231 and pointers 232 of FIG. 6A may be a "full backup" of the copy of the data set showing the current state of file 320 (e.g., reflecting the latest data received in backup images for the data set, or files included in image 112).

According to some embodiments, there are 4 possibilities,
1. A block is the same. Which means it has the exact same contents at a specific FBN in a file path compared to the previous backup.
2. A block has been updated. Which means it has different contents at a specific FBN in a file path compared to the previous backup.
3. A new block. This may happen when a file size expands in the new backup. Suppose the old backup had 4 blocks and the new one has 5 blocks the 5$^{th}$ one is new.
4. A deleted block. This may happen when a file size shrinks in the new backup. Suppose the old backup had 5 blocks and the new one has just 3 blocks the last 2 blocks are deleted.

Thus, it may not be possible to determine or identify whether a particular block got deleted. Moreover, the processes described above with respect to FIGS. 5A, 5B, 6A, and 6B can be performed during writing of the blocks of data from the backup image, without additional "scratch" space, or without the need for additional data structures, such as maps and the like. These processes can also be performed in "real" time or "on the fly" as the backup of the subsequent image is being performed. According to some embodiments, such processes may be performed by system 225, 231 and/or software therein.

Figure 7A:
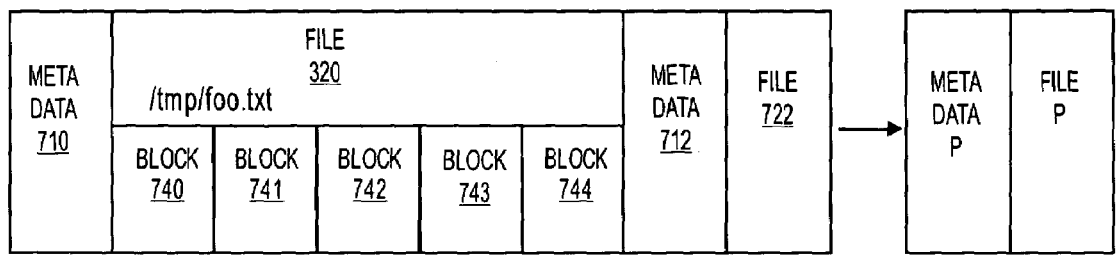
FIG. 7A shows a second incremental backup image structure.

FIG. 7A shows a second incremental backup image structure. FIG. 7A shows second incremental backup image 114 including meta-data 710, file 320 (e.g., with filename /tmp/foo.txt), meta-data 712, file 722, meta-data P and file P. Also, image 114 may have more or less meta-data fields and file fields similar to the description above with respect to FIG. 3. File 320 of image 114 (e.g., /tmp/foo.txt) includes blocks 740, 741, 742, 743, and 744. Thus, in FIG. 7A, file 320 represents a file having the same file name (e.g., /tmp/foo.txt) or being the same file as 320 of FIG. 3, but including more blocks of data than file 320 did in image 110. Also, in FIG. 7A, file 320 represents a file having the same file name (e.g., /tmp/foo.txt) or being the same file as 320 of FIG. 5A, but including at least one different block of data than file 320 did in image 112. Meta-data 710 may have a relationship with file 320 as described above with respect to meta-data 310 or meta-data 510 and file 320. Likewise, meta-data 712, file 722, meta-data P, and/or file P may represent meta-data 512 or 312, file 522 or 322, meta-data 0 or N, and/or file 0 or N, as described above. Image 114 represents a backup image from source device 102 at a third point in time, such as a point in time after image 110 and of image 112.

Similar to the description above with respect to FIGS. 3, 4A, 4B, 5A, 5B, 6A and 6B, device 105, system 225, system 231 and/or pointers 232 may be used to create and/or update a file system for image 114. Specifically, such creation and/or updating may occur prior to writing blocks of image 114 into physical memory. For example, device 105, system 225, or software or subsystems thereof may identify changes in the data set (e.g., image 110, 112, and 114) from the first point in time of image 110 to a third point in time of image 114. Such identification may include comparing files and blocks of files of image 114 versus those of image 112 and/or 110. First, the files may be compared to identify similar or matching files (e.g., such as files having the same filename and/or in a same inode of a file structure in image 114 as in image 112). Then, blocks of the similar or matching files may be compared to identify similar or matching blocks (e.g., blocks having the same or unchanged data as compared to each other in image 114 as in image 112). These processes, creations, updating, identification, and comparisons may be similar to those described above for FIGS. 3, 4A, 4B, 5A, 5B, 6A and 6B.

Figure 7B:
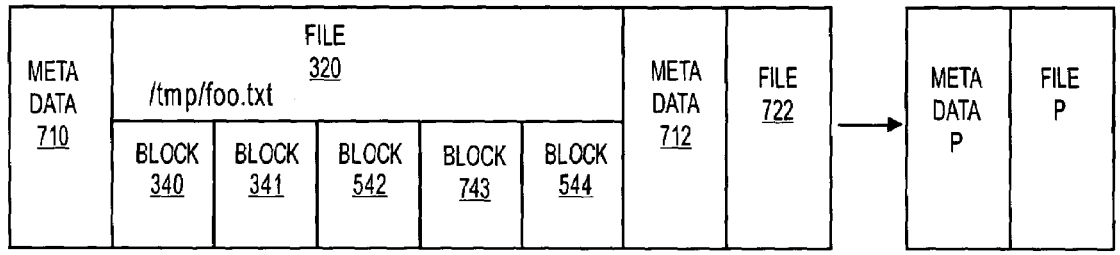
FIG. 7B shows a de-duped second incremental backup image structure.

For example, FIG. 7B shows a de-duped second incremental backup image structure. FIG. 7B shows de-duped second incremental backup image 115 including meta-data 710, file 320 (e.g., with filename /tmp/foo.txt), meta-data 712, file 722, meta-data P and file P. Also, file 320 of de-duped image 115 includes block 340, 341, 542, 743, and 544. Block 743 is an update of block 543. Also, image 115 shows de-duped blocks 340, 341, 542, and 544. Thus, in FIG. 7B, file 320 represents a file having the same file name (e.g., /tmp/foo.txt) or being the same file as 320 of FIGS. 3, 5A and 5B. However, in FIG. 7B, file 320 represents a file having a changed, updated or non-duplicate block of data 743 as compared to file 320 in image 112 of FIG. 5A. Upon receiving image 114 of FIG. 7A, device 105 and/or system 225 updates or creates file system 231 and pointers 232 having address pointers 860 and stored blocks 870 as shown in FIG. 8A, to backup image 114 (such as by storing and point to blocks of image 115 of FIG. 7B).

Figures 8A, 8B:
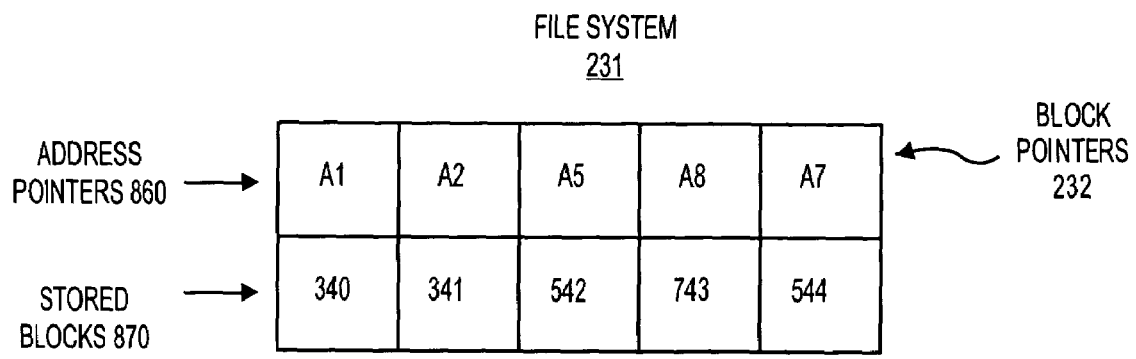
FIG. 8A shows pointers to blocks of backup data for a second incremental backup image.
FIG. 8B shows blocks of backup data stored in physical memory for a second incremental backup image.

FIG. 8A shows pointers to blocks of backup data for a second incremental backup image. FIG. 8A shows pointers 860 and blocks 870 having pointer A1 pointing to block 340, A2 pointing to block 341, A5 pointing to block 542, A8 pointing to block 743, and A7 pointing to block 544. Similar to descriptions above, from file 320 of image 115, only block 743 of image 114 is stored in physical memory, and pointer A8 is used to point that block in pointers 860. Hence, upon receiving image 114, device 105 and system 225 only updates one pointer of system 231 and only stores one block of data (updated block 743) of file 320 of image 114. It can be appreciated that such writing only of blocks of data that have been updated or are new blocks, as described with respect to FIGS. 5-8, saves a great deal of storage space.

For example, FIG. 8B shows blocks of backup data stored in physical memory for a second incremental backup image. FIG. 8B shows physical memory 390 including addresses A1, A2, A3, A4, A5, A6, A7 and A8 at which are stored blocks of data 340, 341, 342, 343, 542, 543, 544, and 743. Again, it can be appreciated that the blocks and addresses of memory 390 shown in FIG. 8B are substantially less (e.g., require less storage space) than would be required to save all of the blocks of each version of file 320 of image 110, 112, and 114. Specifically, block 340 and 341 need only be saved once to back up all three images. Likewise, block 542 and 544 need only be saved once to back up each of image 112 and 114. Moreover, since all of the pointers A1-A8 are preserved as are the previously stored blocks which have since been updated, it is possible to restore image 114, image 112, or image 110 from the data stored in memory 390 of FIG. 8B.

As shown in FIGS. 7A, 7B, 8A and 8B, block 743 may be stored in physical memory 390 as backup data for image 114 (e.g., when added with blocks 340, 341, 342, 343, 542, and 544) at a third point in time corresponding to a "snapshot" taken of a desired set of data of source device 102 at the third point in time, after the second point in time described for FIGS. 5A, 5B, 6A and 6B.

Moreover, the processes described above with respect to FIGS. 7A, 7B, 8A, and 8B can be performed during writing of the blocks of data from the backup image, without additional "scratch" space, or without the need for additional data structures, such as maps and the like. These processes can also be performed in "real" time or "on the fly" as the backup of the subsequent image is being performed. According to some embodiments, such processes may be performed by system 225, 231 and/or software therein.

For example, FIG. 9 shows blocks of backup data recalled for a recall of various backup images. FIG. 9 shows data restored for file 320-910 including address pointed by file system 231-910 and blocks restored 930. Restoring data as described herein may include recalling data, and/or otherwise providing back to a source device, or to another device, data received from a source device in backup images (e.g., such as at various points in time). For example, FIG. 9 shows restore of original image 110 having addresses pointed to by file system 231-910 pointing to address A1, A2, A3 and A4. Hence, blocks restored for image 110 are blocks 340, 341, 342, and 343 (e.g., see FIG. 8B). Note that blocks restored 930 for image 110 may be restored at any point after the first point in time at which those blocks are written to physical memory (e.g., FIG. 4B).

Likewise, FIG. 9 shows restore of first incremental image 112 having addresses pointed to by file system 231-910 including addresses A1, A2, A5, A6, and A7. Hence blocks restored 930 for image 112 include blocks 340, 341, 542, 543, and 544 (e.g., see FIGS. 5B and 6B). Similarly, the restoring of blocks for image 112 may be performed at any point after those blocks are written to physical memory as shown in FIG. 6B. Finally, FIG. 9 shows restore of second incremental image 114 address pointed to by file system 231-910 including addresses A1, A2, A5, A8 and A7. Hence, blocks restored 930 includes blocks 340, 341, 542, 743, and 544 for image 114. Thus, image 114 may be restored at any point once all the blocks are written to physical memory at FIG. 8B (e.g., see FIGS. 7B and 8B).

Again, it is noted that as shown in FIGS. 8B and 9, after the third point in time at which image 114 is received and only blocks of data that have been updated or are new for image 114 are written to physical memory, image 114 may be restored, as well as any previously images (e.g., image 110 or 112)

It can be appreciated that such writing only of blocks of data that have been updated or are new blocks, as described with respect to FIGS. 5A-8B, saves a great deal of storage space. Thus, space saving is achieved, since this process can be performed during writing of the blocks of data from the backup image, without additional "scratch" space, or without the need for additional data structures, such as maps and the like.

Moreover, since this concept can be applied as the blocks of data for the image are being written or stored into the storage space (e.g., in "real" time or "on the fly") it is quicker than, can save processing time compared to, and requires less resource than other processes that require that an entire backup image is written to storage space or that require that processing after the entire backup is written to the storage space.

Figure 10:
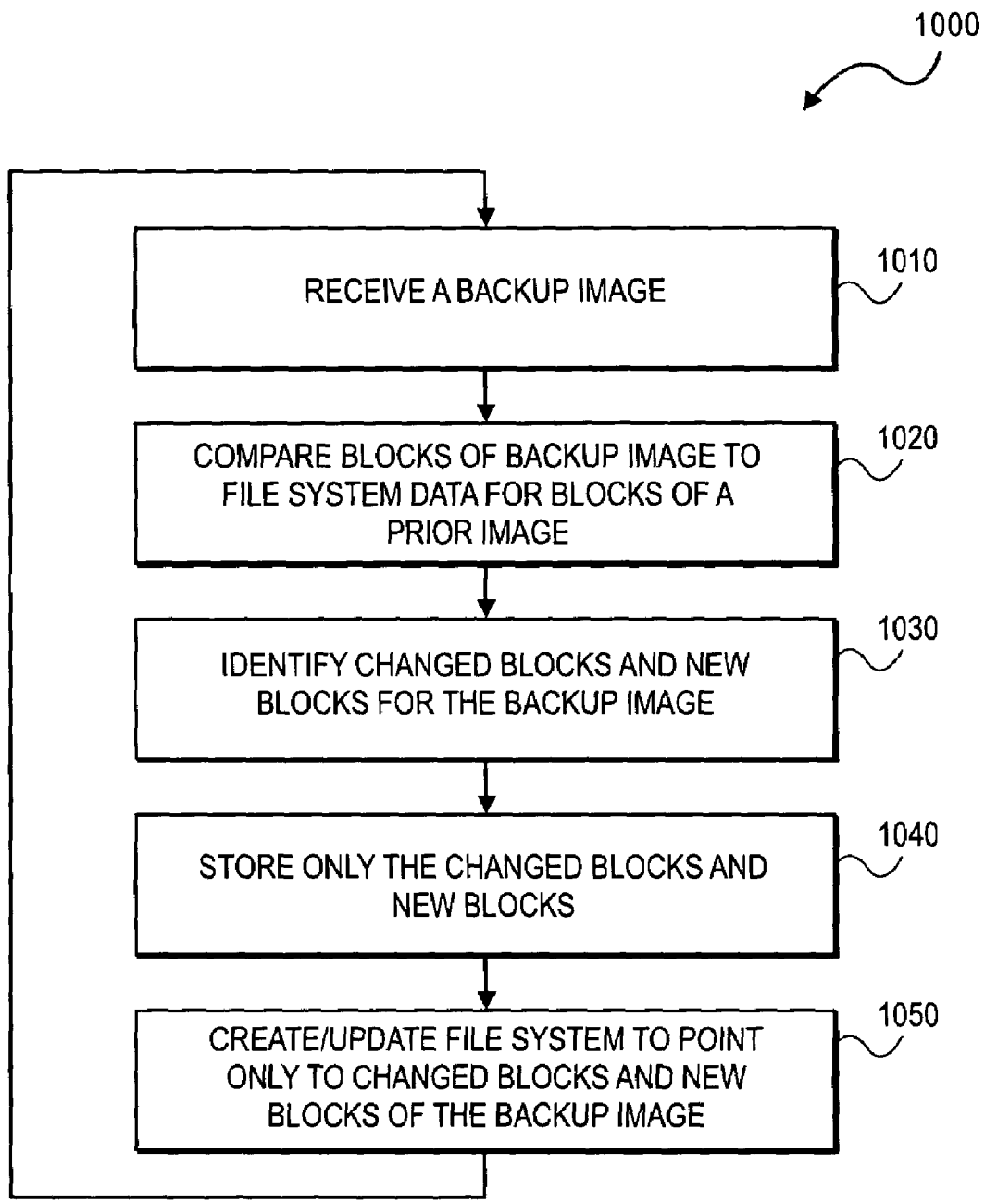
FIG. 10 is a flow diagram of a process for backing up only blocks of data that are new or changed.

FIG. 10 is a flow diagram of process 1000 for backing up only blocks of data that are new or changed. The descriptions below for FIG. 10 may or may not correspond to processes to perform the functions described and shown herein with respect to FIGS. 1-9. For example, FIG. 10 may describe a process that is performed to back up image 110, and repeated to back up image 112, and image 114.

Process 1000 includes subprocess 1010 where a backup image is received. Subprocess 1010 may correspond to receiving any of images 110, 112, or 114 at device 105, such as through network adaptor 260 and/or from or over medium 103 from device 102. Subprocess 1010 may include receiving a backup image that is an original backup image, or an incremental backup image after an original backup image. Subprocess 1010 may include receiving an image that has one or more files including one or more blocks, and that may or may not include meta-data.

At subprocess 1020, blocks of the backup image received at subprocess 1010 are compared to file system data for blocks of a prior image received. Subprocess 1020 may include comparing blocks of data of an image received at device 105 with blocks of data for an image previously received by device 105. For example, subprocess 1020 may include comparing blocks of image 112 with blocks of image 110; or comparing blocks of image 114 with blocks of image 112. In some embodiments, it may be possible for subprocess 1020 to include comparing an image with a prior image that was not the previous image received (such as comparing image 114 to image 110). Subprocess 1020 may include comparing blocks of an image that are similar to blocks of the previous image, are updates of blocks of the previous image, and/or are new blocks of data as compared to the previous image. Subprocess 1020 may also include byte by byte comparisons between blocks of a received image and corresponding blocks of a prior image stored in memory 390, as described above for FIGS. 5A, 5B, 6A, and 6B. Moreover, such a comparison may include comparing meta-data information of a file including blocks of a received image with file system information of a file including blocks of a prior image, where the file system information is derived from the prior image, as described above for FIGS. 5A, 5B, 6A, and 6B. Subprocess 1020 may include other comparisons as described above for FIGS. 5A, 5B, 6A, and 6B. Thus, it is possible to identify that for file 320 that block 340 and 341 are the same in image 113 as they are in image 110, that block 542 and 543 are updates of blocks 342 and 343, and that block 544 is a new block.

At subprocess 1030 changed blocks and new blocks for the backup image are identified. Subprocess 1030 may include device 105 and/or system 225 identifying which blocks of a subsequent or image received at a second point of time are changed or new blocks as compared to blocks for the same file received in a prior image or an original image. For example, subprocess 1030 may correspond to identifying blocks 542 and 543 as updated blocks and block 544 as a new block in image 112 as compared to image 110.

At subprocess 1040, only the changed blocks and new blocks are stored. Subprocess 1040 may correspond to device 105 and/or system 225 storing only the changed blocks or new blocks of the image received in disks 250 and/or 230. For example, for file 320 of image 112, only blocks 542, 543, and 544 are stored, but blocks 340 and 341 of image 112 are not stored (e.g., see de-duped image 113). Instead, pointers 660 and blocks 670 of FIG. 6A have pointer A1 pointing to block 340 of image 110 and pointer A2 pointing to block 341 of image 110. Thus, it is not necessary again to save block 340 and block 341 from image 112 or to point to those blocks.

According to some embodiments, performing the functions described and shown (e.g., with respect to FIGS. 1-10) may be done without searching backup images for specific files to backup images (e.g., such as during backing up or writing of data blocks to backup an image). For example, consider two separate images 112 and 114, having file 320 (/tmp/foo.txt) starting at two completely different offsets within the backup images 112 and 114. Using file system 231 (e.g., pointers therein) to mirror the file system of images 112 and 114, allows for backup as described herein without or excluding searching the entire backup image 112 and/or 114 to locate where the file /tmp/foo.txt is to be found. Instead, the position of the file in the unpacked file system (e.g., file system 231) eliminates the need for searching. Specifically, the file system "directly" gives the location of the file 320 which is, for instance, in the directory /tmp/ under the name foo.txt. Moreover, in some cases, all the backups (e.g., subsequent to image 110 or 112), dedup against file 320 in the directory /tmp/ under the name foo.txt, the duplicate data blocks between backups say 112 and 114 are eliminated (for file /tmp/foo.txt) without having to search for the files or blocks. Also, this is done "on the fly".

Alternatively, a "brute force" process may be considered to perform the functions described herein that requires searching backup images for specific files to backup images (e.g., such as during backing up or writing of data blocks to backup an image). Again, consider two images 112 and 114, having file 320 (/tmp/foo.txt) starting at two completely different offsets within the backup images 112 and 114. File system 231 (e.g., pointers therein) may be excluded and instead, the entire backup image 112 and/or 114 may be searched to locate where the file /tmp/foo.txt is to be found. After searching, the duplicate data blocks between backups say 112 and 114 may be eliminated (for file /tmp/foo.txt). However, in this embodiment, searching for the files or blocks may not be done or possible "on the fly".

At subprocess 1050, a file system is created or updated to point only to changed blocks and new blocks of the backup image received. For example, if the image received at subprocess 1010 is an original image, subprocess 1050 may include creating a file system similar to that shown in FIG. 4A for file 320 of image 110. In other words, the file system is created since all of the blocks received are new blocks as there are no previous blocks from any previous images received (e.g., this image is the first or original image received for this set of data, file, or from device 102). Alternatively, if the backup image received at subprocess 1010 is an incremental image or an image including blocks for files previously backed up, the file system may be updated to point only to blocks of the prior or original image that has been changed or blocks that are new as compared to blocks of the prior or original image.

For example, subprocess 1050 may correspond to updating pointers 460 and 470 to create pointers 660 and 670, by adding pointer A5 pointing to block 542, A6 pointing to block 543, and A7 pointing to block 544 as shown in FIG. 6A, thus providing the capability to recall backup data of image 112. As shown in FIG. 6B, pointers A3 and A4 pointing to blocks 342 and 343 may be preserved as well as preserving storage of blocks 342 and 343 in memory 390, so that data of image 110 can also be recalled by looking at the file system at FIG. 4A (e.g., see FIG. 9).

As shown in FIG. 10, process 1000 may repeat by returning to subprocess 1010 from subprocess 1050. Thus, where a first instance of performing process 1000 may correspond to FIGS. 3, 4A and 4B, a second iteration of process 1000 may correspond to FIGS. 5A, 5B, 6A and 6B; while a third iteration of process 1000 may correspond to FIGS. 7A, 7B, 8A and 8B. Moreover, after an iteration of process 1000, the data backed up or blocks stored may be recalled, such as to restore data lost from device 102 according to the backup image received at subprocess 1010. Thus, after subprocess 1050, a source device or other device may request the backup data be recalled (see FIG. 9 for more details).

Hence, the concepts described herein allow for quickly identifying common or duplicate blocks and eliminating them from a currently received backup to save storage space in the backup device. Every received block being written to the storage space is compared with the existing blocks in a file system that points to, refers, tracks, or records the blocks being stored for each image (e.g., has a record of blocks of previous images). If the received block is a duplicate, the received block is eliminated, and the file system points to the previously stored or old data block. Thus, some embodiments use an active file system of the backup device as a reference for pointing to, referring, or tracking blocks of data from various backup images (e.g., as a reference map to eliminate duplicate blocks between various between backups or backup images).

Figure 11:
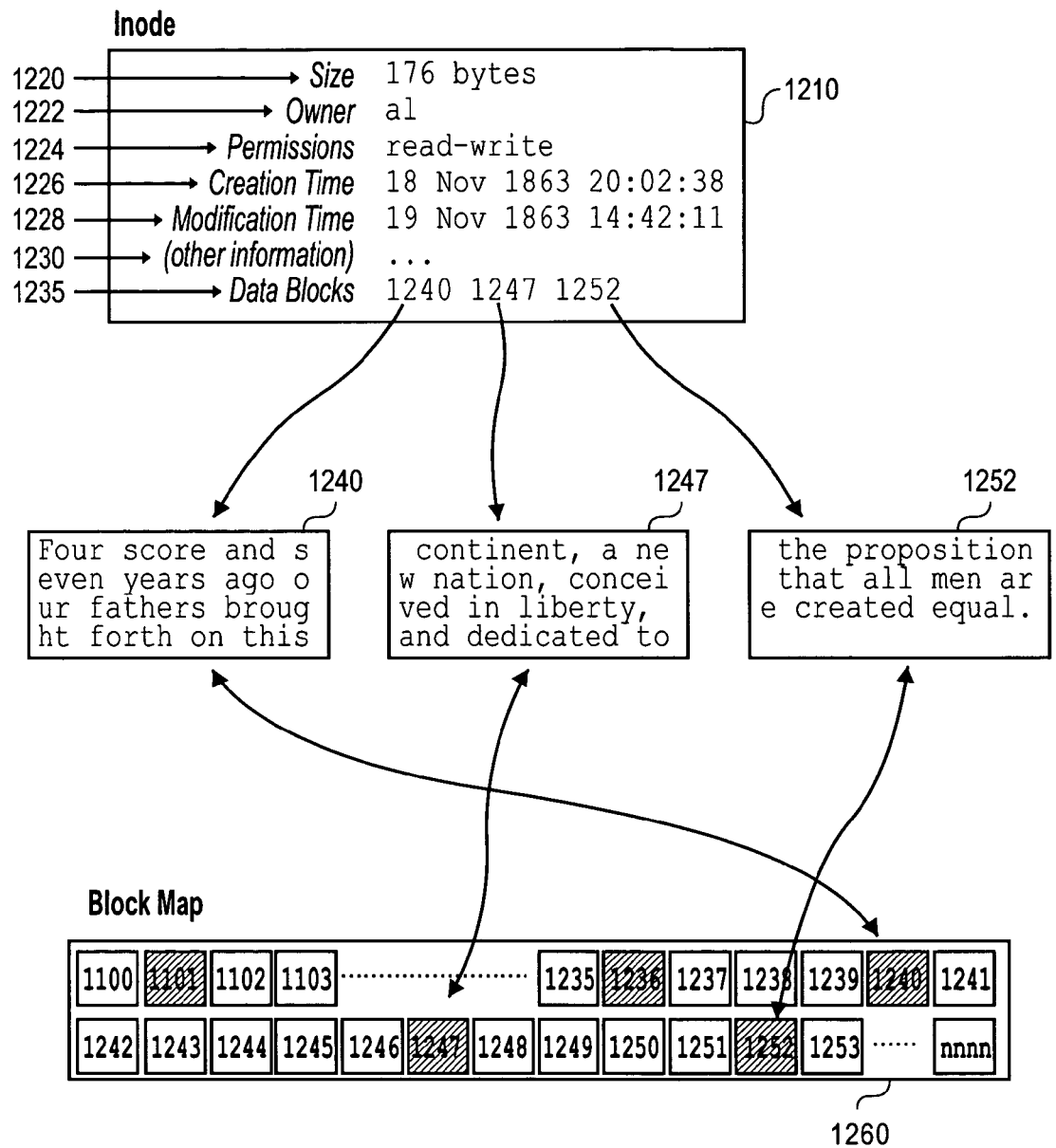
FIG. 11 shows a simplified representation of some of the data structures that may be included in a file systems that may be used with embodiments of the invention.

For instance, FIG. 11 shows a simplified representation of some of the data structures that may be included in a file system that may be used with embodiments of the invention. A first data structure called an "inode" 1210 contains metadata about a file in the file system (for example, the file's size 1220, owner 1222, permissions 1224, creation time 1226, modification time 1228, and other information 1230). It may also contain data block numbers 1235 so that the file contents can be located on the storage volume. Every file is associated with an inode. The file associated with inode 1210 is 176 bytes long, and those bytes are stored in data blocks 1240, 1247 and 1252. (In this simple illustration, data blocks of only 64 bytes are used, but in practical systems, larger blocks—usually in sizes that are powers of two—may be used.) This simple file system also contains a block map structure 1260, which indicates, for each data block in the file system, whether the block is in use. For example, in addition to blocks 1240, 1247 and 1252 which are in use by the data file corresponding to inode 1210, blocks 1101 and 1236 are marked "in use" in block map 1260. Inodes themselves and the block map are data that may be stored in some of the data blocks of a storage system.

Note that neither of the data structures described above contains the file's name. The file system can implement named files and a hierarchical directory structure by placing the names and corresponding inode numbers in a file (which is itself associated with an inode), and treating that file specially as a directory. One inode in a file system is typically designated as the "root directory" of the file system; all other files should be accessible through an inode associated with a filename in the root directory or in a hierarchical descendant of the root directory.

The file system data structures described with reference to FIG. 11 support an operational mode that is used by embodiments of the invention. Consider a file system that contains various files and directories.

Figure 12:
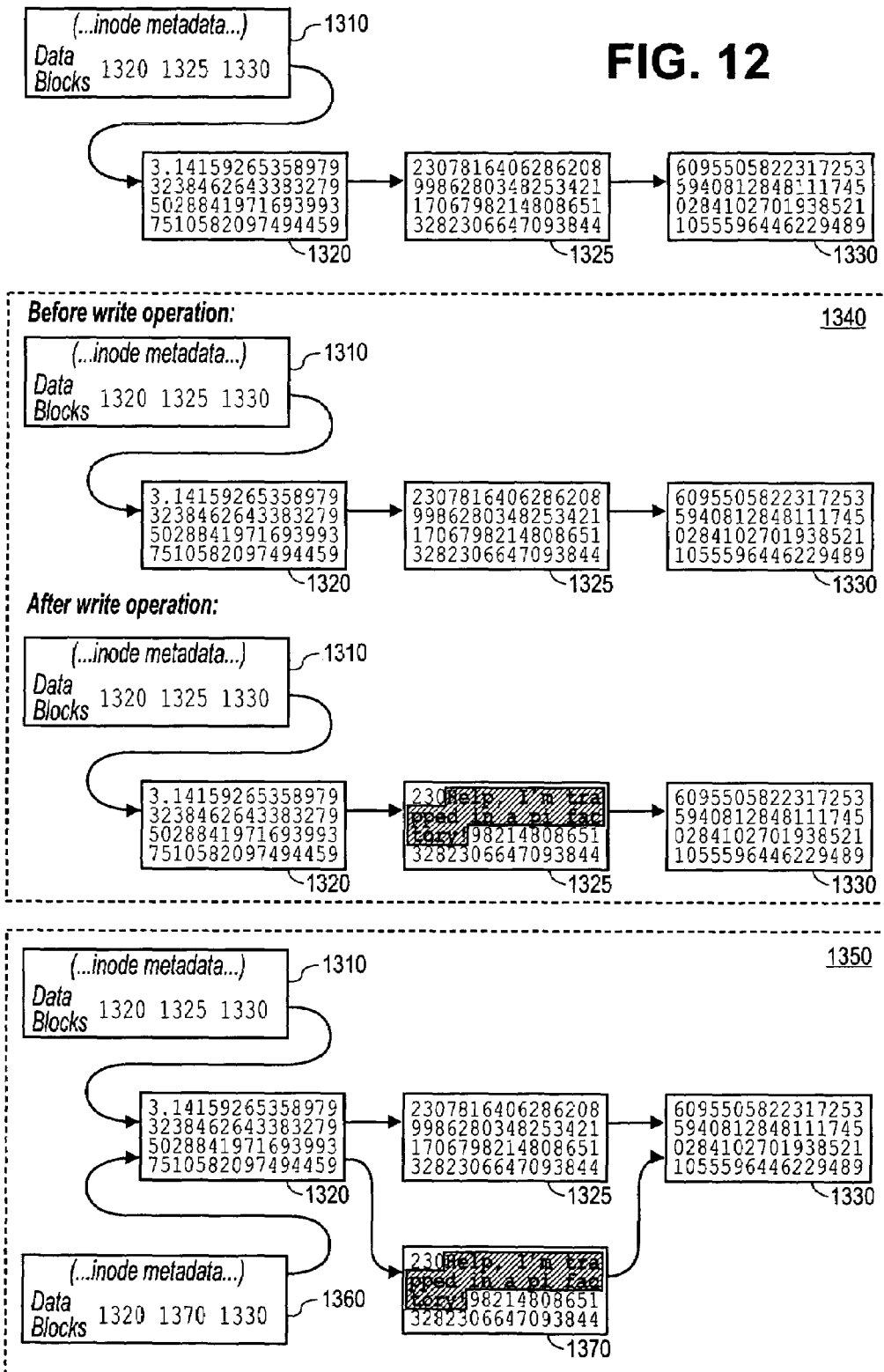
FIG. 12 shows several ways a file's contents can be modified.

FIG. 12 shows several ways a file's contents can be modified. FIG. 12 shows one of the file system files, inode 1310. Inode 1310 contains information to locate data blocks 1320, 1325 and 1330. If the file contents are modified by a write operation, the new data might simply be placed into the currently-allocated data blocks, overwriting some of the existing contents as shown in before-and-after inset 1340. However, it may be useful to preserve the state of the file at a particular time, so instead of overwriting the existing file contents, a new inode 1360 might be allocated and configured to refer to a new sequence of data blocks. Data blocks that are not modified can be shared between the original inode 1310 and the new inode 1360. Inset 1350 shows that original inode 1310 continues to list data blocks 1320, 1325 and 1330, while inode 1360 lists data blocks 1320, 1370 and 1330. Data block 1370 contains the contents of block 1325 as modified by the write operation. The original version of the file is available through inode 1310, while the modified version is available through inode 1360. Thus, inode 1310 describes the file at a point in time just before modifications began to be made through another inode. Eventually, inode 1360 may be preserved as a second point-in-time version, and further modifications may be made within a third sequence of data blocks located by a third inode. The versions persist as long as the inodes describing them are maintained. They are read-only, because some of the data blocks from a file image may be shared with other file images (or with the active file), so modifications made through an image inode might cause unwanted changes in other files as well. These images will be referred to as read-only, persistent point-in-time images ("RPPI"). One example of a RPPI is Snapshot™ by Network Appliance, Inc. of Sunnyvale, Calif. (Snapshot™ is commercially available from or sold by Network Appliance, Inc. of Sunnyvale, Calif.). For instance, a Snapshot™ may be taken of a desired set of data of source device 102 at the specific point in time.

RPPIs can be made of directories, too, since they are simply files that are treated specially for some purposes. Thus, the file system data structures can support an RPPI facility to preserve the state of any file, directory, or complete hierarchy at a point in time. Future modifications to the files and directories occur within data block sequences identified by new inodes, while inodes and blocks that are not modified can be shared with one or more RPPIs.

In the foregoing specification, specific embodiments are described. However, various modifications and changes may be made thereto without departing from the broader spirit and scope of embodiments as set forth in the claims. For instance, in some embodiments, block of data that have been updated (e.g., blocks 342 and 343 of image 110 upon storing blocks 542 and 543 of image 112) can be written over to save even more storage space (e.g., in memory 390). For instance, in FIGS. 6A and 6B, pointer A3 would point to block 542, A6 to block 543, and A7 to block 544, while no pointer would point to block 342 or 343. Thus, blocks 542 and 543 would write over blocks 342 and 343. Of course, at this point, only the latest image, image 112 would be recoverable as blocks 342 and 343 of image 110 would be lost. Also, although descriptions above are with respect to an example of a network-based data backup environment (e.g., source device 102 and backup device 105 of FIG. 1, the concepts above apply equally as well to non network-based data backup environments, such single device backup environment where device 102 and backup device 105 are the same device. The specification and drawings are, accordingly, to be regarded in an illustrative rather than a restrictive sense.

The invention claimed is:

1. A computerized method comprising:
storing first blocks of data of a first file of a first backup image, the first file of the first backup image including only the first blocks of data; and
storing only second blocks of data of the first file of a second backup image, the first file of the second backup image including only the second blocks of data and third blocks of data;
wherein the second blocks of data are only blocks of data including data different than data in the first blocks of data and wherein the first backup image and second backup image are both distinct backup images.

2. The computerized method of claim 1, wherein each of the second blocks of data is either a block of data added to the first blocks of data, or is a block of data having a corresponding block of data in the first blocks of data and including data different than the corresponding blocks of data.

3. The computerized method of claim 1, wherein the second blocks of data are only blocks of data not included in the first blocks of data, and updated blocks of data of the first blocks of data.

4. The computerized method of claim 3, further comprising creating a file system including a first set of pointers to the first blocks of data; and
updating the first set of pointers to point to the second blocks of data and not to point to blocks of data of the first blocks of data for which updated blocks of data are stored.

5. The computerized method of claim 4, wherein storing only second blocks of data comprises:
storing only second blocks of data of the first file in real time during receipt of the second backup image;
comparing meta-data of the second blocks of data and meta-data of the third blocks of data to data in the file system for the first blocks of data to:
identify new blocks of data; and
identify blocks of data of the second blocks of data and the third blocks of data that correspond to blocks of data of the first blocks of data.

6. The computerized method of claim 5, wherein storing comprises comparing bytes of data of the second blocks of data, and bytes of data of the third blocks of data to bytes of data of corresponding ones of the first blocks of data to identify changed blocks of data.

7. The computerized method of creating a subsequent backup copy of a data set, the method comprising:
storing a full backup copy of the data set to reflect a state of the data set at a first point in time, the data set including a plurality of blocks;
identifying changes in the data set from the first point in time to a second point in time; and
storing, as part of said subsequent backup copy, only each block of the data set which has been changed or added.

8. The computerized method of claim 7, further comprising, for each block of the data set which is unchanged, using a reference to the corresponding block in the full backup copy of the data set for said subsequent backup copy, without creating a new copy of said block.

9. The computerized method of claim 8, wherein using the reference includes pointing to an address of each unchanged block and each block of the data set which has been changed or added.

10. The computerized method of claim 8, wherein pointing includes creating a file system.

11. A machine-accessible storage medium storing instructions that when executed cause a machine to:
store in a storage space first blocks of data of a first file of a first computer data backup image, the first file of the first computer data backup image including only the first blocks of data; and
store in the storage space only second blocks of data of the first file of a second computer data backup image received after the first computer data backup image, the first file of the second computer data backup image including only the second blocks of data and third blocks of data;
wherein the second blocks of data are only blocks of data including data different than data in the first blocks of data and wherein the first computer data backup image and the second computer data backup image are both distinct computer data backup images.

12. The machine-accessible storage medium of claim 11, wherein the instructions, when executed cause a machine not to store in the storage space the third blocks of data.

13. The machine-accessible storage medium of claim 11, wherein the third blocks of data are only blocks of data that have a volume block number (VBN) and data equal to a VBN and data of the first blocks of data.

14. The machine-accessible storage medium of claim 11, wherein the instructions, when executed cause a machine to:
create a file system including a first set of pointers to the first blocks of data; and
update the first set of pointers to point to the second blocks of data, not to point to the third blocks of data, and not to point to blocks of data of the first blocks of data for which updated blocks of data are stored.

15. The machine-accessible storage medium of claim 14, wherein updating the file system comprises comparing time of storage data from the meta-data of the first blocks of data, time of storage data from the meta-data of the second blocks of data, and time of storage data from the meta-data of the third blocks of data.

16. A storage server comprising:
a processor coupled to a memory through a bus;
the memory to store an application program that when executed by the processor causes the processor to write to a mass storage device:
first blocks of data of a first file of a first computer data backup image, the first file of the first computer data backup image including only the first blocks of data; and
only second blocks of data of the first file of a second computer data backup image received after the first computer data backup image, the first file of the second computer data backup image including only the second blocks of data and third blocks;
wherein the second blocks of data are only blocks of data including data different than data in the first blocks of data and wherein the first computer data backup image and the second computer data backup image are both distinct computer backup images.

17. The storage server of claim 16, wherein the mass storage device only stores the first blocks of data and the second blocks of data for the first file.

18. The storage server of claim 16, wherein the second blocks of data are only blocks of data having a different VBN than the first blocks of data, and blocks of data having a same VBN as the first blocks of data but having updated data.

19. The storage server of claim 16, wherein the mass storage device further comprises:
a plurality of read-only, persistent point-in-time images pointing to addresses in the mass storage device at which the first blocks of data and the second blocks of data are stored.

* * * * *